Patented Aug. 15, 1933

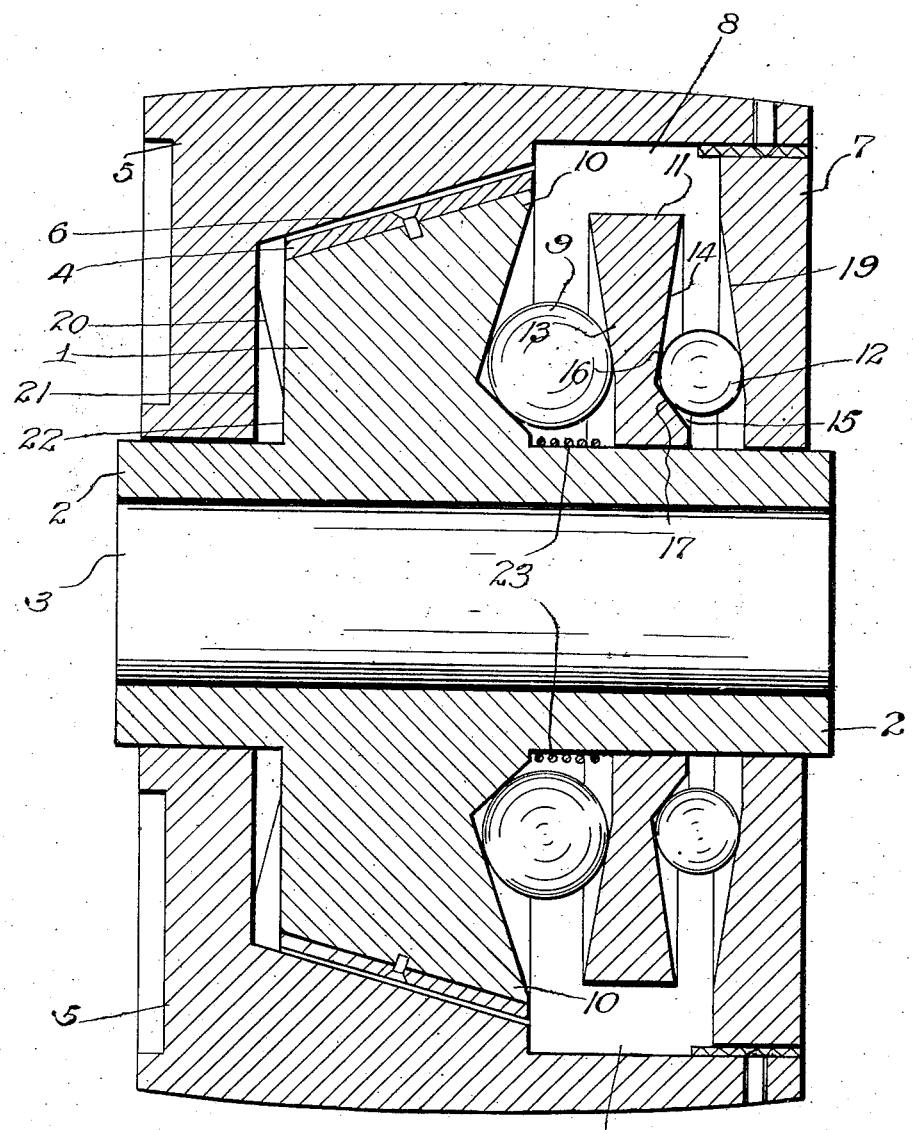

1,922,931

UNITED STATES PATENT OFFICE 1,922,931

CLUTCHING DEVICE

Victor Jean Joseph Defays and Paul Joseph Louis Lefebvre, Brussels, Belgium

Application June 11, 1931, Serial No. 543,666, and in Belgium June 12, 1930

6 Claims. (Cl. 192—105)

This invention relates to clutching devices of the kind in which a driving member having a conical formation cooperates with a driven element provided inside with a corresponding conical surface, the clutching engagement of the said elements being produced through the displacement of balls under the influence of centrifugal force between suitable surfaces forming part of both elements, when the driving element is rotated.

It has been found in practice that in clutching devices of this kind the resisting torque due to the driven element reacts directly upon the balls which are subjected to centrifugal force. The lateral pressure component which is exerted by the balls on the lateral face of the driven element varies in fact with the rotation speed of the said balls and as this speed has a value comprised between the rotation speed of the driving element and the speed of the driven element, the driving torque has an initial value which depends from the relative rotation speeds of both clutching elements on which the balls are acting. It is however desirable that the higher the resisting torque is, the greater also will be the action of the balls and consequently that the speed of rotation of the said balls be independent from the speed of rotation of the driven element.

One object of the invention is to satisfy to this requirement and with this object in view the invention essentially consists in the special arrangement and combinations of parts as hereinafter fully described and pointed out in the appended claims.

Referring to the annexed drawing which shows a vertical section taken through a clutching device constructed according to the invention, 1 is a driving member having a peripheral conical formation and provided with a hub 2 keyed or otherwise fixed on a driving shaft (not shown) passing through a central bore 3. This driving member, which may be provided with a friction sleeve or friction band 4 cooperates, in the example shown with a pulley shaped driven element 5 provided inside with a conical surface 6 of the same conicity as the friction sleeve 4 of the driving element 1. To the driven element 5 which is adapted to rotate freely concentrically to the hub 2 and to be displaced axially on the said hub, a cover 7 is fixed, closing a cavity 8 containing free balls 9 in contact with an inclined face 10 of the driving element 1. According to the invention, the said balls 9 instead of rolling directly between the inclined face 10 of the driving member 1 and the opposite face of the cover 7 of the driven element, as it is the case in clutching devices of this kind as heretofore constructed, are rolling in contact with an auxiliary plate or disc 11 adapted to rotate freely on the hub 2 of the driving member 1 and bearing against balls 12 resting against the cover plate 7. This plate 11 is shaped in such a manner that its concave lateral face 13 which is in contact with the balls 9 tends to displace the said balls towards the center of the hub 2 whilst its lateral face opposite the cover 7 presents two inclined and converging surfaces 14 and 15 forming a groove in which balls 12 are lodged, the said balls having each two contact points 16—17 with the plate 11 and only one point of contact 18 with the inner conical face 19 of the cover 7. Further the said faces 14—15 and 19 are shaped so as to displace the balls 12 towards the center of the concentric elements 1 and 5.

A spring 20 bearing against the inner face 21 of the driven element 5 reacts on the other hand against the outer lateral face 22 of the driving element 1.

So far as described this improved clutching device operates as follows:

The driving element 1 being rotated, for instance by aid of an electromotor (not shown) driving the shaft (not shown) on which the driving element 1 is keyed, this latter starts at the normal speed of revolution of the unloaded motor.

At the moment of starting the rotation of the driving element 1 causes the balls 9 to be rotated at half the rotation speed of the element 1 as indeed, at this moment, the plate 11 is at rest. Under centrifugal influence the balls 9 fly outwards and the resulting lateral pressure component which is exerted on the driven element 5 through the plate or disc 11, balls 12 and cover 7 causes both conical surfaces 4 and 6 to come in contact thus producing a torque on the driven element 5. However, simultaneously the auxiliary plate or disc 11 under the rolling of the balls 9 is also progressively rotated in such a manner that the rotation speed of the balls 9 around the hub 2 is also progressively increased. As a result the centrifugal action of the balls 9 increases in such a manner that during the progressive starting of the plate 11 the torque acting on the driven element increases progressively.

If, at this moment, the resisting torque due to the driven element 5 has a too high value, the two parts or elements 1 and 5 of the clutching device will slide upon each other but as an example the fact that the driven element 5 will remain at rest, will have no retarding effect on the time at which the driving torque will be able to surmount the resisting torque.

It will be observed consequently that owing to the presence of the auxiliary plate or disc 11 and of the supplementary set of balls 12, the driven element 5 together with its cover 7 will be entirely independent of the driving part and that the greater the resisting torque is, the greater also will be the result secured through the free auxiliary plate 11. In case the resisting torque is very small, the clutching between the conical faces 4—6 takes place very rapidly without any appreciable sliding but, in this case, owing to the fact that, at the moment of clutching the auxiliary plate 11 is still at rest or has not yet reached its normal speed of revolution on account of its inertia, it will be obvious that the lateral pressure component which is dependant from the centrifugal force exerted by the balls 9, will not reach its final value at the moment of clutching of the conical surfaces 4—6 and that the adherence pressure of these surfaces will be smaller than if the auxiliary plate 11 was not present; this adherence pressure will only take its final value when the auxiliary plate 11 will be running also at its maximum speed. Consequently in special application in which it may be desirable to accelerate or to retard the starting of the driven element, it will be possible to control the time at which the clutching pressure of both elements 1 and 5 will be sufficient to secure the starting of the driven element. This control will be realized by varying the time in which the auxiliary plate 11 will reach the speed of revolution which is necessary to cause the balls 9 to produce the lateral pressure component due to centrifugal force corresponding to the said clutching pressure.

Such a control will be obtained by varying the speed of revolution of the auxiliary plate 11. In the example shown, this action is secured by a coiled spring 23 which is placed between the plate 11 and the driving element 1. In this case, the plate 11 being frictionally carried with the driving element will more rapidly reach the required speed of revolution in such a manner that the starting torque will be reached sooner and that consequently the starting will be accelerated. Obviously should the spring 23 be located between the plate 11 and the cover 7 of the driven element, then the result secured would be reversed or in other words the moment of starting would be retarded. Consequently it will be observed that in any given case, it will be possible to accelerate or to retard the clutching moment of the elements 1 and 5 by accelerating or retarding the revolution of the plate 11 either by aid of the driving element 1 or by the braking action of the driven element 5. Further it will also be understood that owing to the fact that the balls 9 and 12 are free to revolve along the faces 10—13—14 and 19, the device as described will be reversible that is to say will operate correctly and with the same advantages as well in the case that the element 5 is the driven element and the element 1 the driving element as above described or in the case that the element 5 is the driving element and the element 1 the driven element. The diameter of the balls 9 and 12 will be chosen in each case according to the special requirements to which the device must satisfy. The balls 12 may have the same diameter as the balls 9 or a different diameter.

What we claim is:

1. In a clutching device a driving element having a conical formation and a lateral inclined face, a driven element surrounding the driving element and adapted to rotate freely around the said driving element and to be displaced axially relatively thereto, the said driven element formed with a cavity, a set of free balls located in the said cavity and cooperating with the inclined face of the driving element, a plate or disc also located in the said cavity and against one face of which the said balls exert a lateral pressure component under centrifugal force when they are rotated through the driving element and a second set of free balls located between the opposite face of the plate or disc and one face of the driven element.

2. In a clutching device, a driving element, a driven element, conical friction surfaces on each of the said elements, means whereby the said conical friction surfaces are normally held out of contact from each other, a set of free balls cooperating with a lateral face of the driving element, a second set of balls cooperating with the driven element, a plate or disc located between the two sets of balls, the said plate being adapted to rotate independently of both the driving and driven element and means whereby the speed of revolution of the said plate may be controlled to vary the lateral pressure component of one of the sets of balls due to centrifugal force.

3. In a clutching device, a first member or element having a frictional clutching surface, a second element provided inside with a frictional clutching surface corresponding to the clutching surface of the first element and surrounding the first element, this second element being adapted to be brought into contact with the first element in a clutching relation, a set of free balls coacting with the first element, a second set of free balls coacting with the second element, and a single free plate or disk located between the said sets of balls.

4. In a clutching device, a first element having a conical formation and an inclined lateral face, a second element surrounding the first element and adapted to rotate freely around the first element and to be displaced axially relatively to the said first element, this second element having also a lateral surface, a set of free balls in contact with the inclined lateral face of the first element, a second set of free balls in contact with the lateral face of the second element, and a single free plate or disk located between the said sets of balls.

5. In a clutching device, a driving element having a conical element and a lateral inclined face, a driven element surrounding the driving element and adapted to rotate freely around the said driving element and to be displaced axially relatively thereto, the said driven element formed with a cavity having a lateral inclined face, a set of free balls located in the said cavity and cooperating with the inclined face of the driving element, a plate or disk having two lateral faces and also located in the said cavity and against one lateral face of which the said balls exert a lateral pressure component under centrifugal force when they are rotated through the driving element, and a second set of free balls located between the second lateral face of the plate or disk and the lateral face of the driven element.

6. A clutching device according to claim 2, wherein the speed controlling means is a spring.

VICTOR JEAN JOSEPH DEFAYS.
PAUL JOSEPH LOUIS LEFEBVRE.